United States Patent [19]

Takeuchi et al.

[11] Patent Number: 4,649,903
[45] Date of Patent: Mar. 17, 1987

[54] SOLAR HEAT COLLECTOR

[75] Inventors: Hirosato Takeuchi; Toshio Mikiya, both of Tokyo, Japan

[73] Assignee: Nitto Kohki Co., Ltd., Tokyo, Japan

[21] Appl. No.: 808,388

[22] Filed: Dec. 16, 1985

Related U.S. Application Data

[63] Continuation of Ser. No. 472,836, Mar. 7, 1983, abandoned.

[30] Foreign Application Priority Data

Mar. 7, 1982 [JP] Japan ............................. 57-31801[U]

[51] Int. Cl.$^4$ .................................................. F24J 3/02
[52] U.S. Cl. .................................... 126/443; 126/448; 138/113
[58] Field of Search ............................... 126/443, 448

[56] References Cited

U.S. PATENT DOCUMENTS

| 980,505 | 1/1911 | Emmet | 126/443 |
|---|---|---|---|
| 3,227,153 | 9/1963 | Godel et al. | 126/443 |
| 3,467,143 | 9/1969 | Croft | 138/113 |
| 4,124,019 | 11/1978 | Heffelfinger | 138/113 |
| 4,133,298 | 1/1979 | Hayama | 126/443 |
| 4,205,655 | 6/1980 | Hunt | 126/443 |
| 4,215,674 | 8/1980 | Riggs | 126/443 |
| 4,282,857 | 8/1981 | Pei | 126/450 |
| 4,308,857 | 1/1982 | Sims | 126/443 |
| 4,377,155 | 3/1983 | Tonomura | 126/443 |
| 4,452,233 | 6/1984 | Goodman et al. | 126/443 |

Primary Examiner—Samuel Scott
Assistant Examiner—Carl D. Price
Attorney, Agent, or Firm—Birch, Stewart, Kolasch & Birch

[57] ABSTRACT

An evacuated double-tubing solar heat collector including an inner tube, a selective absorption film applied over an exterior surface of the inner tube and an outer tube. The inner tube is constructed to be received within the outer tube and a spring ring is positioned on the inner tube for engaging an interior surface of the outer tube as the inner tube is inserted into the outer tube for spacing the inner tube relative to the outer tube. The spring ring is rotatably positioned on the inner tube to facilitate the insertion of the inner tube into the outer tube. Further, the inner tube includes an open end and the outer tube includes an open end which are fused to form a junction and hermetically sealed after the inner tube is inserted into the outer tube.

2 Claims, 4 Drawing Figures

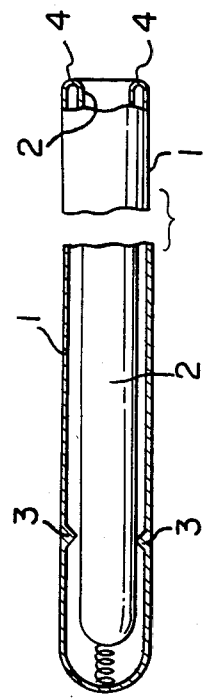
FIG. I
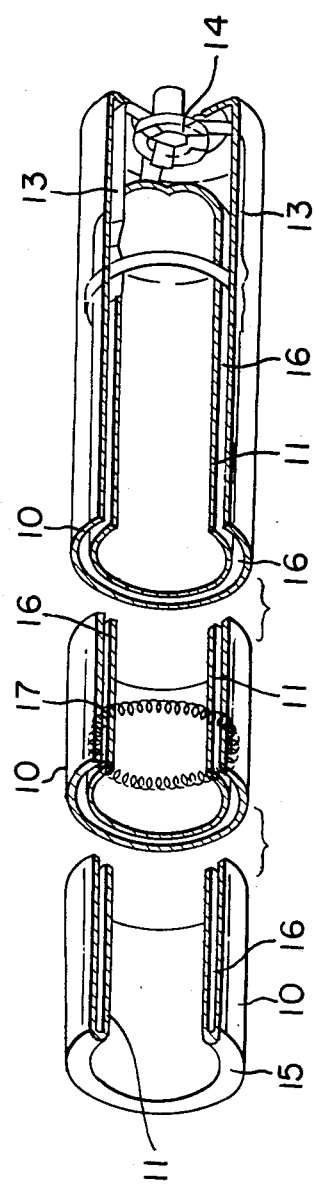
FIG. 2

SOLAR HEAT COLLECTOR

This application is a continuation of application Ser. No. 472,836 filed on Mar. 7, 1983, now abandoned.

BACKGROUND OF THE INVENTION

1. Field of the Invention

This invention relates to an evacuated double-tubing type solar heat collector including an inner tube and an outer tube which is, in particular, designed to reduce or eliminate the possibilities of the inner tube being broken due to external vibrations.

2. Description of Background Information

A variety of solar heat collectors are well-known in the art. A representative evacuated double-tubing type solar heat collector, which is currently the most effective in view of heat absorption, includes an elongate outer glass tube into which an elongate inner glass tube is inserted. The inner glass tube includes a selective absorption film applied over its surface and the space between both tubes is evacuated to a high degree of vacuum.

However, with this type of solar heat collector it is likely that the inner tube may vibrate within the outer tube during transportation or handling. In view of the fact that the least careless handling of the solar heat collector may cause deflection of the inner tube within the outer tube, cracking or breakage takes place at the junction of the open end portions of both tubes. The junction between the inner and outer tubes is most susceptible to deflection. As a result, the insulating layer of vacuum is exposed to the ambient air and the collector does not work at all. This problem is primarily attributable to the fact that both tubes are formed of an elongate, hollow glass material.

Another problem with a conventional collector is that, as shown in FIG. 1, an outer tube 1 is provided at a point near its base end with a centripetally projecting dimple 3, which functions as a spacer for keeping the tube 1 away from an inner tube 2 at a given interval. The dimple 3 serves as a spacer to some degree, but cannot possibly absorb the vibration of the tube 2 due to the fact that the dimple 3 is formed of a glass material (a rigid material) from which the tube 2 is formed. Hence, the vibration of the inner tube 2 gives rise to a rattling noise and, eventually, leads to breakage of a junction 4 between the outer tube 1 and the inner tube 2 as referred to above.

SUMMARY AND OBJECT OF THE INVENTION

This invention has for its purpose to eliminate the above-mentioned drawbacks by the provision of a durable solar heat collector which, even upon receiving external vibrations, can absorb the vibration and deflection of the inner tube to prevent any breakage of the collector, and functions permanently without fear of breakage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a partly sectioned view showing one example of a prior art solar heat collector, wherein the central portion thereof, as viewed in its lengthwise direction, is omitted;

FIG. 2 is a partly sectioned view showing part of one embodiment of the present invention and illustrating portions adjacent to both ends and the central portion thereof;

DETAILED DESCRIPTION OF THE INVENTION

Figure 3:
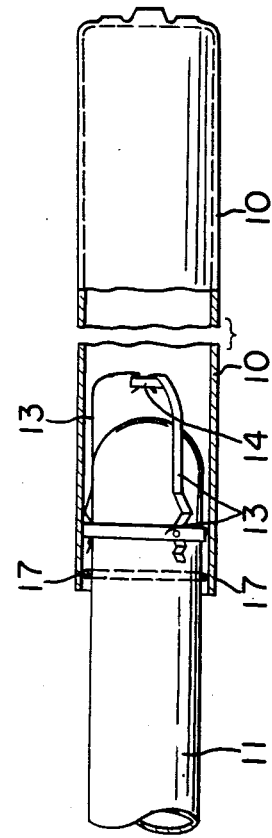
FIG. 3 is a partly sectioned view showing the initial state of insertion of the inner tube into the outer tube, wherein the middle portion of the outer tube is omitted.
Figure 4:
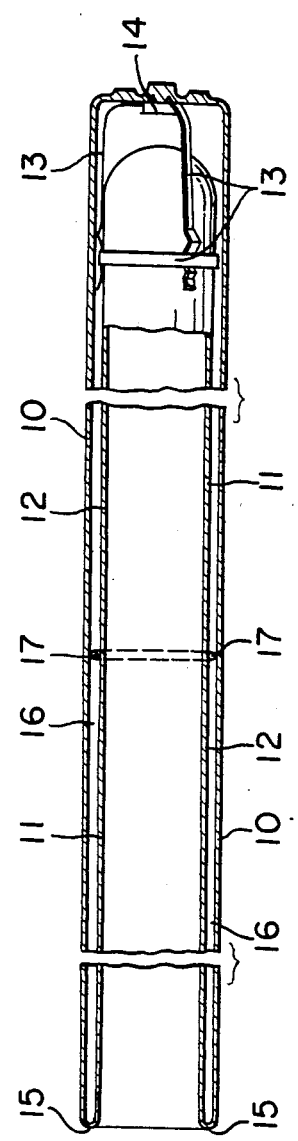
FIG. 4 is a longitudinally sectioned view showing the assembled solar heat collector according to this invention, wherein unessential parts thereof are omitted.

Referring to FIGS. 2–4, an elongate outer tube 10 is formed of heat resistant glass, and is open at one end and is closed at its other end. Likewise, an elongate inner tube 11 is formed of heat resistant glass, and is open at one end and is closed at its other end.

A selective absorption film 12 is applied over the surface of the inner tube 11 by vapor deposition. Preferably, the absorption film 12 has an absorptivity of more than 93%.

A spacer fitting 13 is attached to the closed end of the inner tube 11 for fixing the closed end of the inner tube 11 to the closed end of the outer tube 10. The spacer fitting 13 is provided at its distal end with a getter metal 14 which is flashed to adsorb a quantity of gas remaining within the space between the inner and outer tubes after the space has been evacuated to a given degree of vacuum. A junction 15 is formed at the open ends of both the outer tube 10 and the inner tube 11 where the two tubes are fused together. A high vacuum insulating layer 16 is located in the space between the outer tube 10 and the inner tube 11.

A spring ring 17 is arranged between the inner and outer tubes 11 and 10. In this embodiment, the spring ring 17 is fitted over substantial the middle of the inner tube 11 as viewed in its lengthwise direction, and is adapted to come into contact with the associated inner portion of the outer tube 10.

Although not illustrated, a suitable pipe member is inserted into the inner tube 11 for circulation of a suitable heat medium such as water, as known in the art.

The embodiment of this invention works as follows. In assembling the inventive solar heat collector, the spring ring 17 is fitted over a portion of the inner tube 11 located adjacent to the end of the inner tube 11. The spacer fitting 13 including the getter metal 15 is attached to the distal end of the inner tube 11.

As depicted in FIG. 3, the inner tube 11 is then inserted through the open end of the outer tube 10 until the spacer fitting 13 comes into engagement with the closed end of the outer pipe 10. In the process of insertion of the inner tube 11 into the outer tube 10 the spring ring 17 fitted over the inner tube 11 moves, while coming into rotating contact with both tubes 10 and 11, to approximately a middle position as viewed in the lengthwise direction. The spring ring 17 serves, on the one hand, as a spacer for keeping the inner tube 11 away from the outer tube 10 at a given interval and, on the other hand, as an aid for inserting the inner tube 11 along the axis of the outer tube 10 in a smooth and rapid manner.

After insertion, the outer and inner tubes 10 and 11 are fused together at their open ends to form a junction 15. The space between both tubes is then evacuated to a given degree of vacuum by means of a suitable vacuum pump. An amount of gas still remaining within the space is finally adsorbed onto the getter metal 14 by flashing to form a completely insulating layer of vacuum 16.

With the invention solar heat collector arrangement, there is no possibility that the inner tube 11 may deflect and break when the arrangement is subjected to external vibrations. The vibration of the inner tube is completely absorbed by the spring ring 17 located adjacent approximately the middle portion thereof.

As explained in the foregoing, this invention provides a novel solar heat collector in which an inner tube 11 having a selective absorption film 12 applied over its surface is inserted into an open end of an outer tube 10. The inner tube 11 is fitted therearound with a spring ring 17 which contacts the associated inner surface of the outer tube 10. Accordingly, even when the solar collector is subjected to external vibrations during transportation, the spring ring 17 absorbs the resulting vibration of the inner tube with no fear of breakage of the junction 15 between both tubes. As indicated above, the junction 15 is most susceptible to deflection. Thus, the inventive solar heat collector can work permanently in a satisfactory manner.

Unlike the conventional arrangement wherein the inner tube is supported by a rigid member the vibration of the inner tube per se is absorbed by the spring ring 17, thus not giving rise to any rattling noise. This arrangement makes it unnecessary to pay extra attention to the handling of the collector. The spring ring 17 functions not only as a spacer but also improves the efficiency of insertion of the elongate inner tube 11 into the elongate outer tube 10, since it travels while rotating. Thus, this invention is a breakthrough in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An evacuated double-tubing solar heat collector comprising:
    an inner tube having an open end and a closed end;
    a selective absorption film applied over an exterior surface of said inner tube;
    an outer tube having an open end and a closed end;
    said inner tube being constructed to be received within said outer tube; and
    a substantially continuous annular coil spring ring being substantially found in cross section and of a predetermined thickness, said coil spring ring disposed between and engaging an interior surface of said outer tube and the exterior surface of said inner tube for spacing and resiliently supporting said inner tube relative to said outer tube and being freely rotatably positioned to be moved axially along the length of the inner tube due only to frictional forces exerted on said coil spring and said coil spring ring being positioned on said inner tube at approximately a middle position along the length of said inner tube by being initially positioned on said inner tube adjacent to the closed end thereof and rotated upon itself axially along the inner tube only by frictional engagement with said interior surface of said outer tube as said inner tube is inserted into said open end of said outer tube and moved to a fully inserted position within the outer tube, said open end of said inner tube and said open end of said outer tube being fused to form a junction and hermetically sealed.

2. An evacuated double-tubing solar heater according to claim 1, and further including a spacer fitting mounted on said inner tube for positioning said inner tube relative to said outer tube.

* * * * *